United States Patent
Hunukumbure et al.

(10) Patent No.: US 9,338,721 B2
(45) Date of Patent: May 10, 2016

(54) MIMO WIRELESS COMMUNICATION SYSTEM

(71) Applicant: FUJITSU LIMITED, Kawasaki-shi, Kanagawa (JP)

(72) Inventors: Rajaguru Mudiyanselage Mythri Hunukumbure, Hillingdon (GB); Matthew Webb, London (GB)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 14/042,122

(22) Filed: Sep. 30, 2013

(65) Prior Publication Data

US 2014/0098793 A1 Apr. 10, 2014

(30) Foreign Application Priority Data

Oct. 5, 2012 (EP) .................................. 12187490

(51) Int. Cl.
| | |
|---|---|
| *H04W 36/30* | (2009.01) |
| *H04L 5/00* | (2006.01) |
| *H04L 25/03* | (2006.01) |
| *H04B 7/04* | (2006.01) |
| *H04W 72/08* | (2009.01) |
| *H04B 17/15* | (2015.01) |

(52) U.S. Cl.
CPC .............. *H04W 36/30* (2013.01); *H04B 7/0452* (2013.01); *H04B 17/15* (2015.01); *H04L 5/006* (2013.01); *H04L 5/0023* (2013.01); *H04L 5/0073* (2013.01); *H04L 25/03891* (2013.01); *H04W 72/082* (2013.01)

(58) Field of Classification Search
CPC ............ H04L 12/4641; H04L 41/0846; H04L 41/0853
See application file for complete search history.

(56) References Cited

U.S. PATENT DOCUMENTS

| | | | |
|---|---|---|---|
| 8,190,094 B2 | 5/2012 | Kim et al. | |
| 8,964,869 B2 * | 2/2015 | Li et al. | 375/267 |
| 2007/0248172 A1 * | 10/2007 | Mehta et al. | 375/260 |
| 2009/0103486 A1 | 4/2009 | Hunukumbure et al. | |

(Continued)

FOREIGN PATENT DOCUMENTS

WO    WO 2011/013887 A1    2/2011

OTHER PUBLICATIONS

3GPP TS 21.101 V10.3.0, "Technical Specification Group Services and System Aspects Rel. 10," Mar. 2013, 39 pages.

(Continued)

*Primary Examiner* — Chandrahas Patel
(74) *Attorney, Agent, or Firm* — Arent Fox LLP

(57) ABSTRACT

In a LTE-based wireless communication system having neighboring first and second cells a first user in the first cell may experience significant interference from downlink transmissions in the second cell. Such interference can be reduced by selecting a precoder for downlink transmission to a second user in the first cell which will result in reduced interference to the first user after the first user is handed-over to be served by the second cell. The method involves selecting, among a plurality of users in the first cell, the second user to receive the precoded downlink transmissions using the selected precoder. The second user is chosen so as to satisfy a measure of suitability using the selected interference-reducing precoder. Taken together, the choice in the first cell of precoder and second user ($UE_A$) result in reduced inter-cell interference.

16 Claims, 6 Drawing Sheets

(56) References Cited

U.S. PATENT DOCUMENTS

2012/0014458 A1 1/2012 Lee et al.
2012/0093078 A1 4/2012 Perlman et al.

OTHER PUBLICATIONS

3GPP TS 21.101 V8.4.0, "Technical Specification Group Services and System Aspects Rel. 8," Mar. 2012, 42 pages.
3GPP TS 21.101 V9.2.0, "Technical Specification Group Services and System Aspects Rel. 10," Mar. 2012, 42 pages.
ETSI TS 136 211 V10.4.0, "Physical Channels and Modulation," Jan. 2012, 103 pages.
ETSI TS 136 211 V1.5.0, "Physical Layer Procedures," Mar. 2012, 127 pages.
LAN/MAN Standards Committe et al., "Air interface for Broadband Wireless Access Systems," Advanced Air Interface, Feb. 2011, 1120 pages.
Search Report issued in European Patent Application No. 12187490.3, mailed Mar. 19, 2013, 5 pages.
Spencer et al., "Zero-Forcing Methods for Downlink Spatial Multiplexing in Multiuser MIMO Channels," IEEE Transactions on Signal Processing, vol. 52, No. 2, Feb. 2004, pp. 461-471.

\* cited by examiner

MIMO WIRELESS COMMUNICATION SYSTEM

CROSS-REFERENCE TO RELATED APPLICATIONS

This application claims priority to European Patent Application No. 12187490.3, filed Oct. 5, 2012. The disclosure of the prior application is hereby incorporated in its entirety by reference.

FIELD OF THE INVENTION

The present invention relates to wireless communication systems, and more particularly to wireless communication systems having multiple-input, multiple-output (MIMO) capability, especially but not exclusively OFDMA systems including those compliant with the LTE and LTE-A groups of standards.

BACKGROUND OF THE INVENTION

Wireless communication systems are widely known in which a base station (BS) communicates with multiple subscriber stations (SS or MS, also called users) within range of the BS. The area covered by one BS is called a cell and typically, many base stations are provided in appropriate locations so as to cover a wide geographical area more or less seamlessly with adjacent cells. Each BS divides its available bandwidth, i.e. frequency and time resources, into individual resource allocations for the users. There is a constant need to increase the capacity of such systems in order to accommodate more users and/or more data-intensive services.

OFDM is one known technique for transmitting data in a wireless communication system. An OFDM (Orthogonal Frequency Division Multiplex)-based communications scheme divides data symbols to be transmitted among a large number of subcarriers (also called frequency fingers) which are equally spaced in frequency, hence frequency division multiplexing. By carrying only a small amount of data on each subcarrier, the bit rate per subcarrier is kept low and hence intersymbol interference is reduced. Data is modulated onto a subcarrier by adjusting its phase, amplitude, or both phase and amplitude.

The "orthogonal" part of the name OFDM refers to the fact that the spacings of the subcarriers are specially chosen so as to be orthogonal, in a mathematical sense, to the other subcarriers. More precisely, they are arranged along the frequency axis such that the sidebands of adjacent subcarriers are allowed to overlap but can still be received without inter-subcarrier interference, commonly referred to as ICI. In mathematical terms, the sinusoidal waveforms of each subcarrier are called eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different users of the wireless communication system, the result is a multi-access system referred to as OFDMA. (In this specification, the term OFDM is henceforth used to include OFDMA). By assigning distinct frequency/time resources to each user in a cell, OFDMA can substantially avoid interference among the users within a cell. However, interference from adjacent cells can still be a problem as explained later.

A further modification of the basic OFDM scheme is called MIMO OFDM, where MIMO stands for multiple-input multiple-output. This scheme employs multiple antennas at both the transmitter and the receiver to enhance the data capacity achievable between the BS and each user. For example, a 4×4 MIMO channel is one in which transmitter and receiver communicate with one another each using four antennas. There is no need for the transmitter and receiver to employ the same number of antennas. Typically, a base station in a wireless communication system will be equipped with many more antennas in comparison with a mobile handset, owing to differences in power, cost and size limitations.

Considering the simplest example of a transmitter (e.g. base station) communicating with a single receiver (subscriber station), the MIMO channel is the frequency (or equivalently time delay) response of the radio link between the transmitter and receiver. It contains all the sub-carriers, and covers the whole bandwidth of transmission. A MIMO channel contains many individual radio links hence it has Nt×Nr SISO channels (also called subchannels). For example, a 2×2 MIMO arrangement contains 4 links, hence it has 4 SISO channels. The SISO channels can be combined in various ways to transmit one or more data streams to the receiver.

FIG. 1 is a conceptual diagram of a generalized MIMO system. In FIG. 1, a transmitter transmits signals utilizing Nt transmitting antennas, and the receiver receives the signals from the transmitter utilizing Nr receiving antennas. The characteristics of the individual SISO channels or subchannels between the transmitter and receiver are denoted by $H_{0,0}$ to $H_{Nr-1, Nt-1}$, and as indicated in the Figure, these form terms of a matrix called the channel matrix or channel response matrix H. "$H_{0,0}$" indicates the channel characteristics (for example, channel frequency response) for transmitting signals from the transmitting antenna 0 to the receiving antenna 0. "$H_{Nr-1, Nt-1}$" indicates the channel characteristics for transmitting signals from the transmitting antenna Nt−1 to the receiving antenna Nr−1, and so on. Since the receiving antennas are not individually addressable by the transmitter, there are a maximum of $N_t$ data streams.

In FIG. 1, the symbols $x_0$ to $x_{Nt-1}$, which are transmitted using the transmitting antennas $N_0$ to $N_{Nt-1}$, form a transmit vector x. Likewise, received signals $y_0$ to $y_{Nr-1}$, which are received using the receiving antennas $N_0$ to $N_{Nr-1}$, together form a received signal vector y. Without precoding (see below), the vectors y and x are related by:

$$y = Hx + n \quad (1)$$

where H is the channel matrix and n is a term representing noise in each receiving antenna.

The channel matrix H has a rank which is the number of independent rows or columns, which in practical terms means the number of independent signals capable of being transmitted from the antenna ports. When some of the rows or columns are mutually-dependent (indicating correlation between the individual subchannels) the MIMO channel is called "rank deficient". In such a case, the MIMO channel is incapable of providing the maximum data throughput due to correlation.

MIMO transmission schemes include so-called non-adaptive and adaptive configurations. In the non-adaptive case, the transmitter does not have any knowledge of the channel properties and this limits performance, as the transmitter cannot take account of changes in conditions (channel profile). Adaptive schemes rely on the receiver feeding back information (channel-state information or CSI) to the transmitter, or locally deriving the CSI, allowing it to adapt the transmitted signal to changing conditions and maximise data throughput. A feedback path (not shown) from the receiver to the transmitter carries the feedback signals for informing the transmitter of the channel properties.

Closed loop systems are required in FDD (Frequency Division Duplex) systems, where the uplink (mobile to base station) and downlink (vice-versa) employ two different carrier frequencies. Because of the frequency change, the uplink and downlink channels are different and CSI needs to be fed back. In TDD (Time Division Duplex) systems the uplink and downlink are transmitted in two adjacent time slots on the same frequency. The two time slots are within the channel coherence time (the channel does not change) so the channel state information need not be fed back. The transmitter can estimate the channel from the received signal on the reverse link, usually aided by the insertion of pilots or known waveforms by the transmitter into the signal sent on the reverse link.

The invention to be described is mainly applicable to FDD systems, and to the downlink, namely transmissions from a base station acting as the transmitter to its users acting as receivers, rather than with the uplink.

Typically, MIMO configurations involve pre-coding at the transmitter, whereby the data symbols to be transmitted are weighted using eigenvectors of each subcarrier, subchannel or subchannel group. In other words, channel-state information is used to adapt the transmit vector x to the channel conditions. This effectively allows the MIMO channel to be decomposed into a set of parallel SISO channels, so-called elgenmode signalling, so that the symbols are (given perfect channel-state information) perfectly separated at the receiver. The eigenmodes available in the channel are also called spatial modes. Preceding can be either linear, achieving reasonable results whilst limiting the complexity of processing, or non-linear, achieving near-optimal results but at the cost of greater complexity. One form of linear precoding is so-called "zero-forcing".

Since the radio channel from eNB to UE varies over time, space and frequency, the transmission from the eNB can be received with higher quality if it is 'preceded' prior to transmission. This modifies equation (1) as follows, where P is the precoder used at a particular time-frequency index:

$$y=HPx+n \qquad (2)$$

In equation (2), the data streams are represented by x, which can be 1 or 2. Even if x is 1 (1×1 vector), the pre-coder P can be 2×1 vector, making Px a 2×1 vector. Hence there are two transmit streams, feeding two transmit antennas, and this can be considered spatial multiplexing even in the case of a single data stream.

In an ideal case, precoder P is selected such as to satisfy P=V in the singular value decomposition (SVD) of H:

$$H=U\Sigma V \qquad (3)$$

with the matrices following the usual SVD definitions.

FIG. 2 is a diagram showing the configuration of a MIMO system in more concrete terms. MIMO system 1 comprises a transmitter 2 which comprises a plurality of transmitting antennas and a receiver 3 which comprises a plurality of receiving antennas.

The transmitter 2 transmits symbols 0 to Nt−1 in parallel using Nt transmitting antennas; the symbols can be created from one data stream, referred to as vertical encoding, or different data streams, referred to as horizontal encoding. In addition, each transmitted symbol corresponds to, for example, one-bit data if the modulation method is BPSK, and corresponds to two-bit data if the modulation method is QPSK. The receiver 3 receives the signals transmitted from the transmitting device 2 using Nr receiving antennas, and it comprises a signal regeneration unit 4 which regenerates the transmitted symbols from the signals received. In this configuration, a number of spatial modes is available corresponding to the minimum value of Nt and Nr.

As indicated by the arrows in FIG. 2, the signals transmitted from each of the plurality of transmitting antennas are received by each of the plurality of receiving antennas, giving rise to Nt×Nr subchannels in total. In other words, the signals transmitted from the transmitting antenna (0) are received by receiving antennas (0) through (Nr−1), and likewise, the signals transmitted from the transmitting antennas (Nt−1) are also received by the receiving antennas (0) through (Nr−1). The characteristics of the subchannel which propagates the signals from the i-th transmitting antenna to the j-th receiving antenna are expressed as "$H_{ij}$" and form one component term of the Nt×Nr channel matrix H.

The subchannel characteristics are measured prior to transmission of actual data, typically by sending pilot signals. The transmitter 2 first transmits a pilot signal using the transmitting antenna (0). The receiver 3 receives the pilot signal transmitted from the transmitting antenna (0) through the receiving antennas (0) to (Nr−1). In this case, since the transmitting power of the pilot signal is determined in advance, the receiving device 3 obtains each component ($H_{0,0}$ to $H_{0,Nr-1}$) of the first row in the channel matrix by monitoring the power, SNR, etc. of the signal received through the receiving antennas (0) to (Nr−1). Thereafter, each component of the 2nd to Nt-th rows in the channel matrix can be obtained, in the same way using pilot signals transmitted from each transmitting antenna.

In the MIMO system 1, if the symbol x ($x_0 \sim x_{Nt-1}$) is transmitted from the transmitting device 2, the signal y ($y_0 \sim y_{Nr-1}$) detected in the receiving device 3 is expressed by equation (2). Therefore, in the absence of noise n, the receiving device 3 can obtain correct transmitted symbols by detecting the channel matrix H and performing an inverse operation corresponding to the influence of each component in the channel matrix H cn the signal. In practice, however, noise n is present and in addition, the channel matrix H cannot be determined with absolute accuracy. Therefore, the receiver 3 estimates the transmitted symbol from the received signal y and the channel matrix H and introduces an algorithm for minimizing the error of this estimated value.

By way of background explanation, a MIMO-OFDM transmitter and receiver will be briefly outlined with reference to FIGS. 3 and 4. FIG. 3 is a schematic diagram of a MIMO-OFDM transmitter. High-speed binary data is encoded (convolutional code is an example), interleaved, and modulated (using a modulation scheme such as BPSK, QPSK, 64QAM, and the like). Independent channel encoders may be used for each transmitting antenna. Subsequently, the data is converted into parallel low-speed modulated data streams which are fed to N sub-carriers. The output from each encoder is carried separately on a plurality of sub-carriers. The modulated signals are individually pre-coded and then frequency-division multiplexed by N-point inverse fast Fourier transform (IFFT) The resulting OFDM signal is converted into an analog signal by a D/A converter and is upconverted into RF band and transmitted over the air.

At the MIMO-OFDM receiver schematically shown in FIG. 4, the received signals from the Nr receive antennas are filtered by a band pass filter (BPF), and then down-converted to a lower frequency. The down-converted signal is sampled by A/D converter (namely, converted into a digital signal), and the guard interval is removed. Then, the sampled data is fed to the N-point fast Fourier transformer (FFT). After Fourier transformation is performed on each of the signals received through the Nr receive antennas, they are fed to the MIMO signal processing unit 11. Here, the MIMO signal processing unit 11 comprises a signal regeneration unit 4 which performs algorithms to compensate for the channel characteristics, using the channel matrix H and taking account of the precoding applied on the transmitter side. In this example, the output of the MIMO signal processing unit 11 is Nt independent data streams, and each data stream is independently demodulated, de-interleaved, and decoded. However, the outputs may be demultiplexed to form a single data stream, if a single stream was multiplexed, i.e. vertical encoding was applied, at the transmitter on to multiple antennas.

The above explanation has considered the case of a single transmitter sending MIMO signals to a single receiver, but of course a practical MIMO wireless communication system is much more elaborate than this, providing many mutually-adjacent cells in each of which a base station transmits over respective MIMO channels to multiple subscriber stations simultaneously. In practice, the adjacent cells overlap to some extent such that transmissions from one base station in one cell can cause interference to users at the edges of adjacent cells. If the cells have a hexagonal grid arrangement, then one cell may be adjacent to up to six neighbouring cells such that transmissions to a particular user may cause interference in more than one other cell.

MIMO and OFDMA are expected to enable high-capacity data throughput in future wireless communication systems such as those compliant with LTE-Advanced (below, LTE-A), or IEEE802.16m (also called Advanced WIMAX or Gigabit WiMAX). However, the above multi-user interference effects can become a significant obstacle in achieving the expected capacity enhancements in such systems. For example, a user near the edge of one cell, communicating with one BS using a particular frequency/time resource, may interfere with a user in an adjacent cell, served by a different BS using the same frequency/time resource.

In OFDMA based LTE wireless cellular systems, intercell interference, particularly at the cell edges, can be a significant obstacle in providing a high quality of service. Known techniques to mitigate inter-cell interference include Inter-Cell Interference Coordination (ICIC), and enhanced Inter-Cell Interference Coordination (eICIC). Briefly, these schemes work on avoiding the same time frequency resources being used in adjacent cells by eNB co-ordination and has a general distinction between resources which could be used at cell centre and resources which could be used at cell edge.

ICIC is a form of fractional frequency reuse (FFR). Users are grouped according to their Signal-to-Interference plus Noise Ratio (SINR), which is used as an indicator of the level of interference each UE is experiencing. In one form (soft FFR), UEs suffering low interference (usually, users in the cell centre) may use all the available frequencies (a so-called frequency reuse factor of 1). Meanwhile, UEs suffering high interference (cell-edge users) are restricted to specific frequency bands which are different from frequencies used by cell edge users in adjacent cells (thus using a higher frequency reuse factor such as 3).

eICIC is introduced with Rel-10 of the LTE specifications, and relates to so-called heterogeneous networks, in which base stations of differing power and capability are employed to form, in addition to conventional "macro" cells, smaller "pico" or "femto" cells within the macro cells for providing additional capacity. To mitigate interference between a macro cell and several pico cells in its coverage area, eICIC coordinates the blanking of subframes in the time domain in the macro cell. As a result there is no interference in those subframes from the macro cell, and overall system capacity is increased as each pico cells can use the empty subframes without interference from other pico cells. On the other hand the macro cell capacity is reduced because the macro cell can no longer use all the available subframes.

However when the cells become fully loaded (because LTE supports a frequency reuse of 1, to enable higher throughputs), it becomes very difficult to avoid the collisions in the above manner. This problem is aggravated if the signals from supposedly cell centre regions spill over to the cell edges. Such situations can occur for example in street canyons in outdoor networks and in corridors in indoor networks. In such cases some form of interference cancellation is required to provide a good enough service to the cell edge user. In this invention proposal, we provide a methodology to implement a MIMO pre-coding scheme, which can improve the quality of service to the cell edge users. A scenario of particular relevance is where the loading of the two cells is such that schedulers cannot allocate resource blocks to UEs which result in sufficiently low interference to allow acceptable performance, implying that the existing time and frequency domain techniques may not be good enough on their own.

The following LTE standards documents provide background information and are hereby incorporated by reference:
3GPP TS36.213, v.10.5.0
3GPP TS36.211, v.10.4.0.

SUMMARY OF THE INVENTION

According to a first aspect of the present invention, there is provided a wireless communication method in which one or more base stations allocate resources to, and wirelessly communicate with, terminals served by first and second cells, wireless communications with the terminals being performed by precoding in accordance with a precoder, the method comprising:
- detecting that a terminal served by the first cell is subject to interference from the second cell;
- storing a preferred precoder of the terminal when served by the first cell;
- handing over the terminal to the second cell;
- obtaining a resource allocation to the terminal in the second cell;
- determining an interference-reducing precoder on the basis of the stored preferred precoder; and
- selecting another terminal served by the first cell with which to precode communications by the interference-reducing precoder.

In the above method, preferably, the resource allocation to the another terminal is same as (or overlaps with) resource allocation to the terminal handed over to the second cell.

The terminal is typically, though not exclusively, a cell-edge terminal. It is noted that even cell-centre terminals can suffer from high interference, for example in so-called street canyons and corridors.

Preferably, the first cell disposes of a number of antenna ports greater than a number of antenna ports of each terminal, forming a so-called "asymmetric" MIMO system. This MIMO system is more practical as the eNB (BS) can accommodate more antennas, while the reduced size and cost of the UE allows only a few antennas.

In the above method, the detecting may involve the terminal reporting to the first cell that a measurement of signal quality falls below a predetermined threshold. For example, RSRQ may be used for this purpose in the case of an LTE-based system. This is used as an indication that the terminal is suffering significant interference. Since intra-cell interference may be assumed to be controlled by the base station providing the cell, such interference may be inferred to be inter-cell interference.

The preferred precoder may be obtained in the manner as practised in LTE, namely by the terminal transmitting an indication of its preferred precoder to the first cell. This is called the "preceding matrix indicator" (PMI) in LTE, as discussed below.

Normally the first and second cells will be provided by different base stations. In this scenario the references to "first cell" and "second cell" above are equivalent to "first base station" and "second base station" respectively. In this case the obtaining of the resource allocation comprises the first base station receiving an indication of the resource allocation from the second base station.

An alternative scenario is one in which both cells are provided by the same base station. In this case, the obtaining of the resource allocation is a simple matter of retrieving it from the base station's scheduler.

In another form of the method, the resource allocation to the terminal in the second cell is a predetermined resource allocation, in other words this resource allocation can be predefined either in the system specification or by some earlier configuration of the base station. In this case the obtaining simply comprises retrieving stored information of the predetermined resource allocation.

The determining preferably comprises determining, as the interference-reducing precoder, a precoder having greatest orthogonality to the stored preferred precoder. This should ensure that the interference-reducing precoder is (as nearly as possible) in the null space of the interference channel to the handed-over terminal.

To minimise the capacity loss to the selected terminal, the selecting preferably selects, as said another terminal, a terminal served by the first cell whose own preferred precoder has the greatest similarity with the interference-reducing precoder.

A second embodiment of the method combines the determining and selecting in the following way. Recall that in LTE, LTE-A and WiMAX, there are a limited set of possible precoders. It is possible to calculate a "similarity index" between the precoders preferred by each of a number of terminals in the first cell, and a set of candidate precoders suitable for use as the interference-reducing precoder. The selecting can then be performed by choosing a terminal having a high value of this similarity index.

There are various other possibilities for finding an appropriate terminal for use as "said another terminal", as set out in the embodiments of the Detailed Description.

In general, the selecting of said another terminal is performed from among a set of candidate terminals in accordance with one or more selection criteria selected from:
  degree of similarity between the candidate terminal's own preferred precoder, and the interference-reducing precoder;
  SiNR of the candidate terminal;
  degree of correlation of a channel between a said base station providing the first cell and the candidate terminal, and an interference channel between that base station and the terminal after handover;
  physical proximity between the candidate terminal and a base station providing the second cell; and
  capacity loss of communications within the first cell if the candidate terminal is selected.

One or more thresholds may be applied, for example to define the size of the set considered. Thus the selecting may further comprise determining said set of candidate terminals on the basis of whether terminals fulfil at least one threshold value of degree of similarity between the candidate terminal's own preferred precoder, and the interference-reducing precoder.

The method may need to be repeated owing to changes in the inter-cell interference. Thus, the method may further comprise repeating at least the determining and selecting steps to deal with changes in wireless channels in and/or between the cells.

According to a second aspect of the present invention, there is provided a wireless communication system comprising:
  one or more base stations forming first and second cells; and
  a plurality of terminals served by the cells;
  the one or more base stations arranged to allocate resources to, and wirelessly communicate with, terminals served by the first and second cells, and to perform wireless communications with the terminals by preceding in accordance with a precoder, the system comprising:
  means for detecting that a terminal served by the first cell is subject to interference from the second cell;
  means for storing a preferred precoder of the terminal when served by the first cell;
  means for handing over the terminal to the second cell;
  means for obtaining a resource allocation to the terminal in the second cell;
  means for determining an interference-reducing precoder on the basis of the stored preferred precoder; and
  means for selecting another terminal served by the first cell with which to precode communications by the interference-reducing precoder.

According to a third aspect of the present invention, there is provided a base station in a wireless communication system in which a plurality of terminals are served by first and second cells, the base station providing at least said first cell and arranged to allocate resources to terminals and to perform wireless communications with terminals by preceding in accordance with a precoder, the base station having a control unit arranged to:
  detect that a terminal served by the first cell is subject to interference from the second cell;
  store, in a memory, a preferred precoder of the terminal when served by the first cell;
  hand over the terminal to the second cell;
  obtain a resource allocation to the terminal in the second cell;
  determine an interference-reducing precoder on the basis of the preferred precoder stored in said memory; and
  select another terminal served by the first cell with which to precede communications by the interference-reducing precoder.

According to a fourth aspect of the present invention, there is provided a program which, when executed by a processor of a base station, performs any method as defined above.

The program may be stored on one or more non-transitive computer-readable recording media.

In systems known to the art, high levels of inter-cell interference may be experienced by UEs to an extent that existing methods such as FFR and (e)ICIC cannot reduce interference to suitably-low levels. In the case of a network operating a multiple-input multiple-output (MIMO) transmission mode, modifying the transmission profile of an interfering eNodeB by spatial precoding could be used to provide another domain in which interference can be reduced. Embodiments of the present invention provide means for selecting precoders and users jointly in two cells such that interference is reduced further than would be possible by the application of existing techniques alone.

Furthermore, embodiments of the present invention provide this interference reduction without requiring new information from UEs and thus are applicable to systems containing diverse UE populations, extracting a further improvement compared to existing ICIC schemes which are UE capability dependent. The selection of precoders and users is on the basis of a flexible set of metrics so that the tradeoff of reduce interference to one user at the price of potentially reduced information capacity at the other user can be minimized, or controlled to a level acceptable to the network or the network operator. Combined with the fact of backwards compatibility, this means that embodiments of the present invention can be tailored to the needs of many different capabilities of UE, thus allowing interference reduction to be applied very broadly across a network.

BRIEF DESCRIPTION OF THE DRAWINGS

Reference is made, by way of example only, to the accompanying drawings in which.

DETAILED DESCRIPTION

Figure 1:
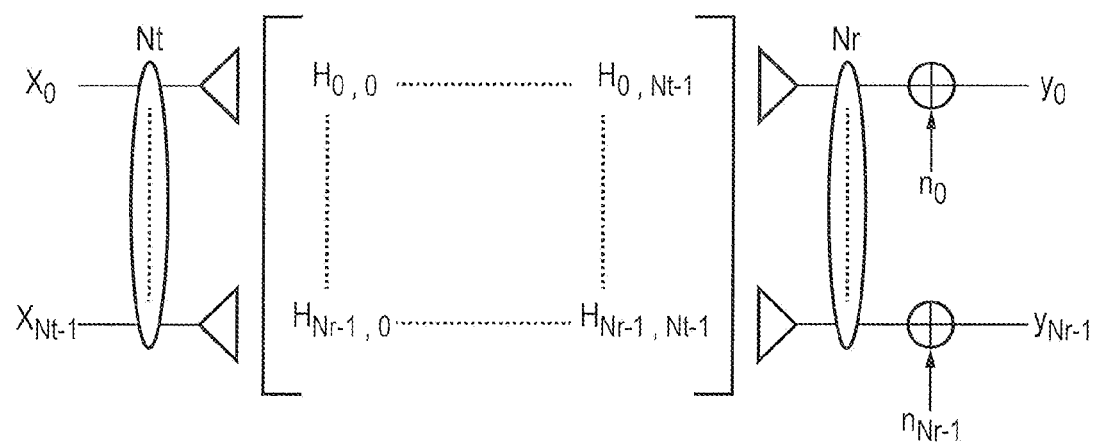
FIG. 1 is a conceptual diagram of a MIMO communication channel.
Figure 2:
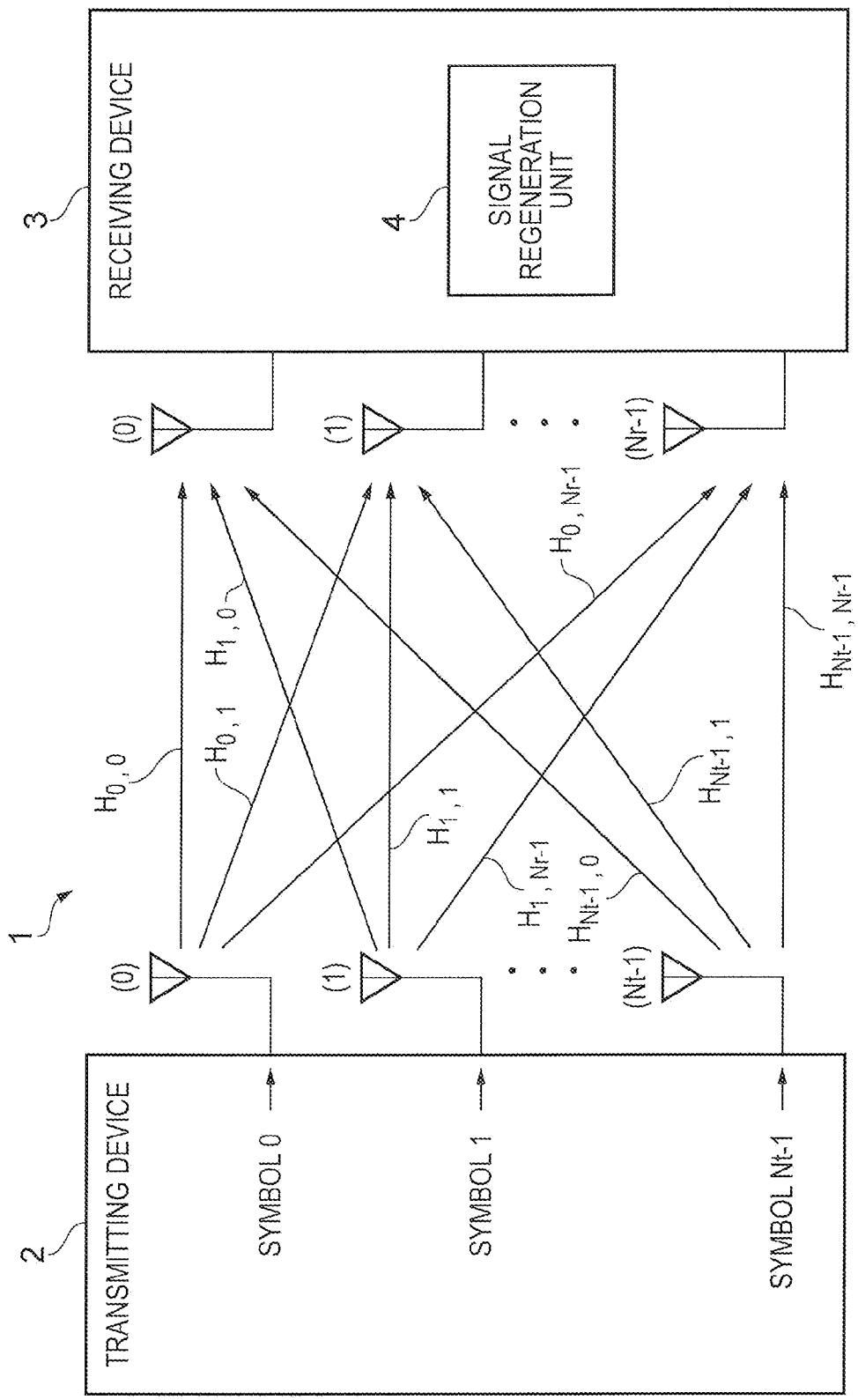
FIG. 2 is a schematic diagram of a transmitter and a receiver communicating via a MIMO channel.
Figure 3:
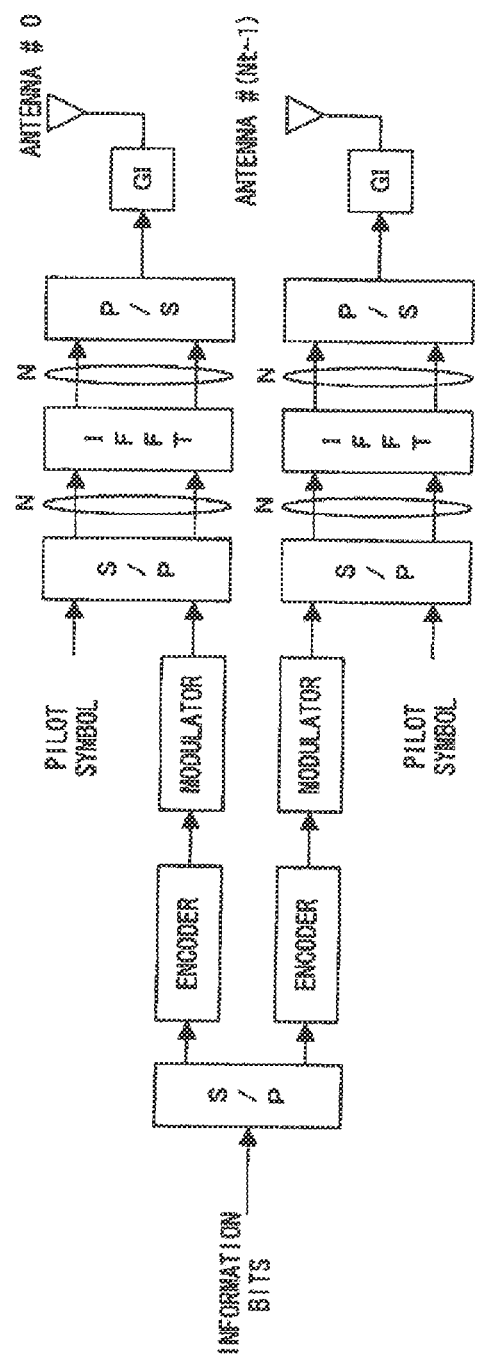
FIG. 3 is a schematic diagram of a MIMO-OFDM transmitter.
Figure 4:
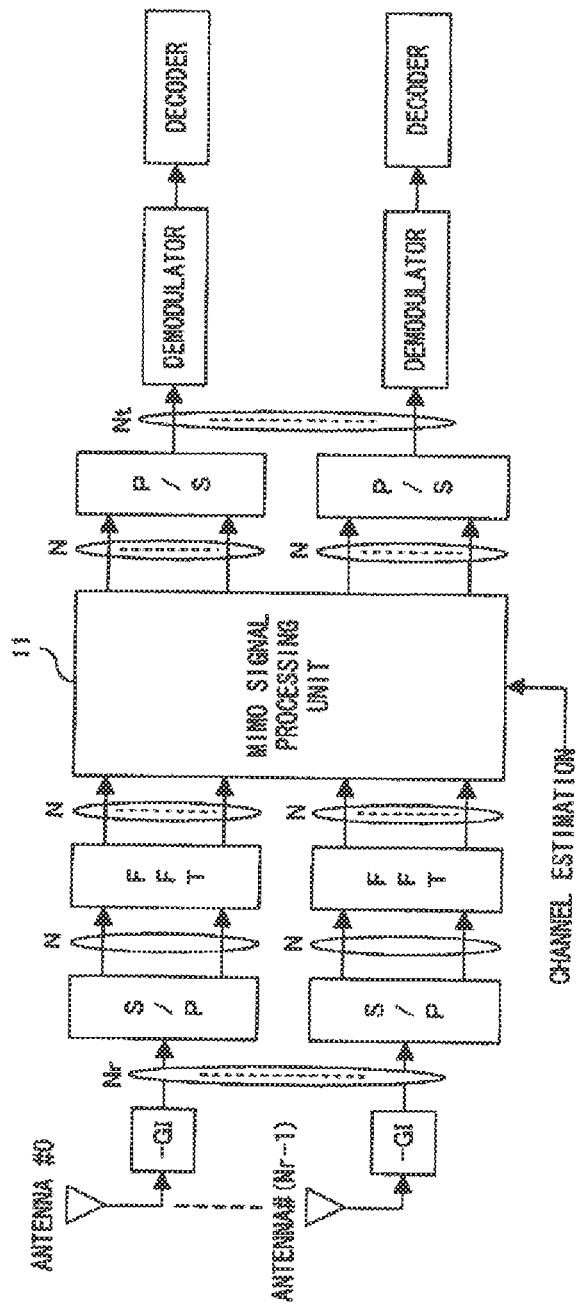
FIG. 4 is a schematic diagram of a MIMO-OFDM receiver.

Before explaining an embodiment of the present invention with respect to FIGS. 5 and 6, an issue with interference mitigation in LTE will be explained, along with "Transmission Modes" (TMs) in LTE will be given, since the described embodiment is based on LTE.

LTE and LTE-A are a group of standards comprising a number of "Releases" such as Rel-8, Rel-9 etc., later Releases offering increased sophistication and placing greater demands on UE capabilities.

In order to support a variety of different operating scenarios, user needs and network needs in LTE, the specifications define a set of transmission modes (TMs). In Rel-8, there are TMs 1-7, and TM 8 is added in Rel-9. The following Table lists the TMs in Rel-9.

| Transmission modes | Description | Comment |
|---|---|---|
| 1 | Single transmit antenna | single antenna port; port 0 |
| 2 | Transmit diversity | 2 or 4 antennas |
| 3 | Open loop spatial multiplexing with cyclic delay diversity (CDD) | 2 or 4 antennas |
| 4 | Closed loop spatial multiplexing | 2 or 4 antennas |
| 5 | Multi-user MIMO | 2 or 4 antennas |
| 6 | Closed loop spatial multiplexing using a single transmission layer | 1 layer (rank 1), 2 or 4 antennas |
| 7 | Beamforming | single antenna port, port |

-continued

| Transmission modes | Description | Comment |
|---|---|---|
| 8 | Dual-layer beamforming | 5 (virtual antenna port, actual antenna configuration depends on Implementation) dual-layer transmission, antenna ports 7 and 8 |

A new Transmission Mode TM9 is added in Rel-10, a multi-layer transmission mode to support closed-loop SU-MIMO up to rank 8, as described in the above mentioned 3GPP TS36.213, v.10.5.0. TM9 combines the features of SU- and MU-MIMO without the need to reconfigure UEs when switching between SU and MU communication. Further TMs are anticipated in future Releases.

Of particular interest for the present invention are the TMs 4, 6 and 9 in which closed-loop downlink spatial multiplexing (SM) is supported.

In these TMs, the eNB's transmissions to a UE are carded on either one or two independent data streams, termed 'codewords' in LTE. The two codewords are mapped to up to eight spatial layers, depending on how many antenna ports are in use for transmission to the UE and the 'rank' of the channel. If there are more layers than codewords, then the codewords may each be mapped to more than one layer, providing some spatial diversity gain.

As already mentioned, an ideal precoder P is selected such as to satisfy P=V in the singular value decomposition (SVD) of H, as per equation (3) above.

However, this is impractical in LTE since it requires full knowledge of H to be sent from the UE to the eNB. LTE's solution is to define a set of possible P matrices from which the UE must choose one, P*, according to a suitable metric, and which is then indicated to the eNB as the UE's preferred precoder. A 'codebook' of precoders contains 4, 16, or up to 256 codewords for eNBs using 2, 4 or 8 antenna ports respectively [1, 2], significantly reducing the feedback load from the ideal case, but making some performance tradeoff since P*≠V in general. The preferred precoder P* could typically be chosen as that which the UE expects will maximise information capacity on the downlink.

As mentioned earlier, the number of independent signals transmitted from the antenna ports is termed the 'rank', r, of the transmission, and in LTE this is selected jointly with P* The codebook for a particular number of antenna ports $n_P$ contains precoders suitable for transmission for all ranks $1 \le r \le n_P$.

There are various different methods defined in the above mentioned 3GPP TS 38.213 as to what time-frequency resolution and basis the rank and precoder should be selected on, but the common feature is that, assuming transmission with possible rank r=1 . . . $n_P$ in turn, the UE calculates its preferred precoder. If this is on the basis of maximising capacity, then the rank can be selected by choosing r such that the capacity across all the spatial layers is maximised. In some modes, the UE can report different P* in each of several subbands in the frequency domain in which case they must all have the same rank. With r now chosen, the P* relevant to that rank is indicated to the eNB along with r (and potentially other information). These are termed the rank indicator (RI) and precoding matrix indicator (PMI) respectively.

The eNB is not required to actually precede with rank r or precoder P*. The actual rank and precoder used may be chosen at the eNB by any method (nothing is specified by 3GPP in this regard), and is signalled back to the UE in the downlink control information (DCI) on PDCCH.

In Rel-8/9/10 of LTE, a UE can only decode PDSCH transmissions from one cell, or one eNB at a time. In order to decode transmissions from another cell, it must be handed over by the network from the source cell into the destination cell. In doing so, the specifications have no requirement for the UE to retain any information relating to preceding in the source cell. This makes it difficult for the network to determine scheduling and preceding in two cells jointly which will help mitigate interference for a cell-edge UE. In a co-pending European Patent Application 08166035.9, the inventors have proposed a user-selection and preceding scheme in which downlink transmissions to a first user in a first cell which are causing significant downlink interference to a second user in a second cell are made with reduced rank and an alternative precoder to P* such that the interference to the second user is reduced at the cost of reduced capacity to the first user.

A problem with implementing this scheme is that the UE cannot provide simultaneous feedback regarding two cells in Rel-8/9/10, and is only able to feedback its preferred precoder (s) P* for the cell to which it is currently connected. Thus, such joint preceding schemes may be difficult to implement with good performance in systems currently known to the art. Furthermore, for such an interference mitigation scheme to have wide applicability, it should operate with UEs of all LTE Releases so that its ability to perform effectively is not limited only to advanced UEs. This creates an additional problem of designing methods of implementing joint scheduling and pre-coding based only on information which can be signalled by UEs compatible with Rel-8.

Thus, methods for providing inter-cell interference mitigation by joint scheduling and precoding whilst not requiring new information from UEs are of significant interest.

The proposed invention provides a method for a MIMO precoding scheme to provide interference reduction (equivalently SINR improvement) to a cell edge user. MIMO precoding for interference cancellation by zero forcing is a well known technique. This invention provides a novel methodology to implement a precoder and suitable in-cell user selections in an LTE based system for MIMO preceding, for asymmetric MIMO systems. In this context, "asymmetric" means that the number of antenna ports in use for relevant receptions at the UE (the receive side), $n_R$, is less than the number of antenna ports in use for relevant transmissions at the eNB (transmit side), $n_T$, as is usually the case. This does not constrain the number of physical antennas or antenna ports either the UE or the eNB may actually possess or have the ability to use. To identify suitable users from among a set where the number of physical antennas or antenna ports at the UE and eNB may be any numbers, methods such as those disclosed in European Patent Application 08165035.9 may be used.

The schematic diagram for the proposed scheme is shown below in FIG. 5. This shows two adjacent cells Cell A and Cell B, provided by respective base stations $eNB_A$ and $eNB_B$. The user $UE_B$ was originally served by $eNB_A$ in Cell A and communicating on channel $H_{AB}$, but is shown communicating via channel $H_{BB}$ with eNB_B, following handover to Cell B. In this state, $H_{AB}$ becomes an interference channel for $UE_B$. Meanwhile another user $UE_A$ continues to be served by $eNB_A$.

The basic idea of the precoding scheme is to cancel the interference the cell edge user UE receives from the neighbour $eNB_A$, via the channel $H_{AB}$. Mathematically the precoder $V_0$ should be in the null space of $H_{AB}$, so that the product of $H_{AB}V_0$ becomes closer to 0. Because we are dealing with asymmetrical MIMO schemes, the null space is inherently present in the MIMO channel and there is no need to sacrifice spatial modes to achieve the nullspace.

A feature of the present invention is to perform handover from eNB_A to eNB_B in order to obtain channel knowledge on $H_{AB}$. This is referred to as a "proprietary" handover since it is not triggered by normal handover criteria.

Further features of this invention are the methodologies to select the interference-cancelling codeword $V_0$ to suit channel $H_{AB}$ and to select a suitable user in cell A to assign the same resources as for user $UE_B$ (in cell B) and then to pre-code with $V_0$. Within the LTE context, the pre-coding choices are limited to a specified code book, so $V_0$ has to be chosen from a finite set of code-words. As the selected user $UE_A$ has to be assigned the same resources as for $UE_B$ and preceded with $V_0$, it can suffer some loss in throughput as the choice of $V_0$ may not be its preferred codeword to maximize throughput. The challenge for this algorithm is to select a proper user $UE_A$, so that this capacity loss is minimized, or at least held to an acceptable level.

The received signal equations for $UE_A$ and $UE_B$, assuming they are scheduled in the same downlink resources by the eNBs, can be stated as follows:

$$y_A = H_{AA}V_0 x_A + H_{BA}V_B x_B + n \quad (1)$$

$$y_B H_{BB}V_B x_B + H_{AB}V_0 x_A + n_2 \quad (2)$$

The first term in both equations relate to signal power, the second term to interference from the neighbour cell and the third term to noise. The aim of the algorithm is to improve the signal quality of $y_B$ (by cancelling the interference), while ensuring that the signal quality of $y_A$ is not excessively degraded. As noted before, $V_0$ may not be the preferred precoder for $UE_A$, while $V_B$ is the preferred precoder for $UE_B$.

Figure 5:
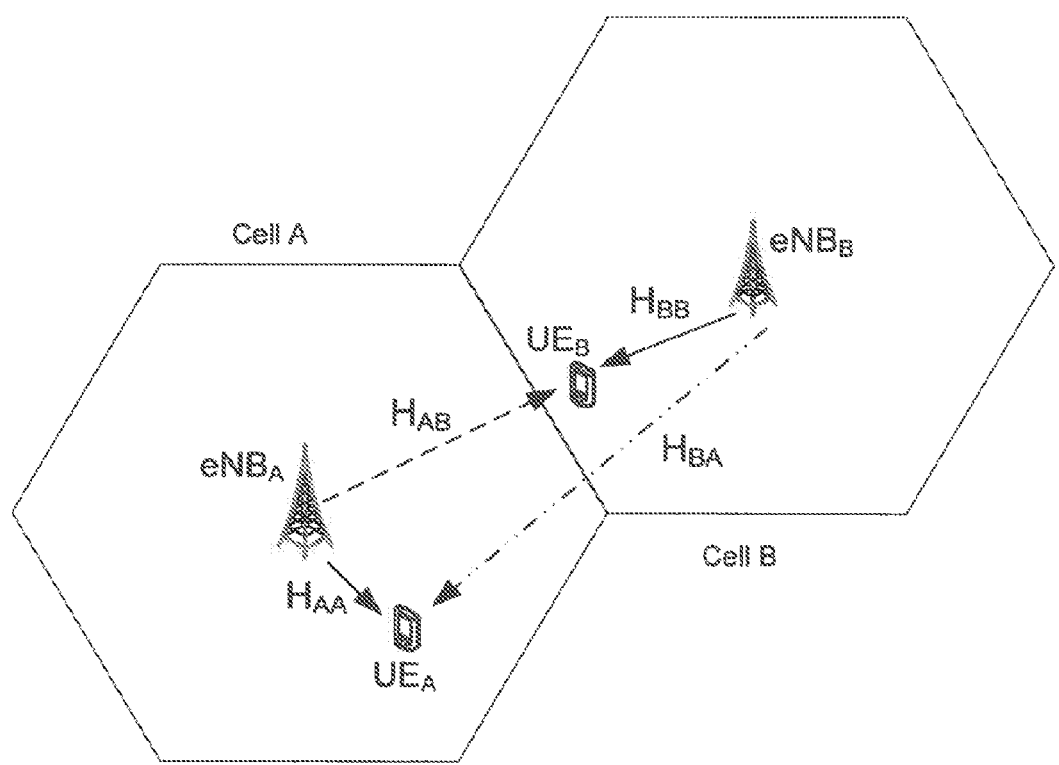
FIG. 5 is a schematic diagram, of an interference scenario to which the present invention may be applied.
Figure 6:
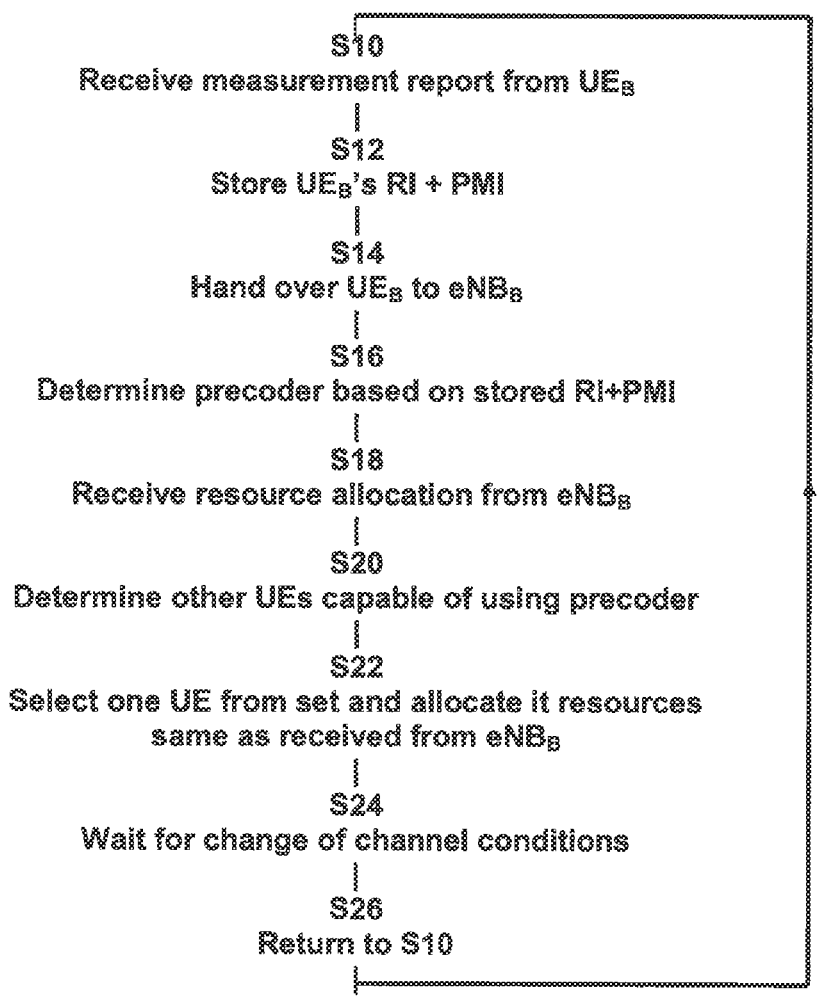
FIG. 6 is flowchart of process steps performed at a base station $eNB_A$ in an embodiment of the present invention.

FIG. 6 outlines a method of the invention, from the perspective base station $eNB_A$ in FIG. 5. The steps in FIG. 6 will typically be taken by a control unit or scheduler of the base station, possibly with some assistance from higher-level nodes in the system. Two cells are shown as part of a wireless communication system; it will be understood that in a practical wireless communication system, there are more than two cells and that the cells are not neatly adjoining hexagons but rather have an amorphous, variable and diffuse extent such that there is some overlap between adjacent cells.

It is assumed, as shown in FIG. 5, that Cell A is provided by $eNB_A$ and adjacent Cell B by a different base station $eNB_B$. It is further assumed that at the art of the procedure, $UE_B$ is served by Cell A, rather than Cell B as indicated in FIG. 5. The steps in FIG. 6 are not necessarily carded out separately, or in the precise order as shown.

In Step S10, during the course of normal operation of the wireless communication system, $eNB_A$ receives various measurement reports from the UEs which it serves, including reports of signal quality (RSRQ). An impaired RSRQ reported from $UE_B$ is taken as an indication that it is experiencing inter-cell interference.

The next step is to identify the interference channel $H_{AB}$ (or at least the preferred precoder for this channel) so that the null space precoder $V_0$ can be derived. In step S12, this is done by storing at least one preferred precoder for the channel $H_{AB}$, as $H_{AB}$ is a user channel before the HO. With the LTE codebook options, it is possible only to obtain the best (preferred) pre-coder information from the UE. As explained earlier, $eNB_A$ will routinely receive this information from $UE_B$ as part of normal control signalling. Other or future wireless communication systems may permit a range of precoder preferences to be signalled by the UE.

The next step S14 is for $eNB_A$ to hand over $UE_B$ to $eNB_B$. This then provides the situation depicted in FIG. 5, in which $UE_B$ is served by $eNB_B$ and the channel $H_{AB}$ now constitutes an interference channel.

Now it becomes possible (step S16) to use the information stored in S12 to derive the orthogonal precoder for this channel, which will nullify the interference, once the HO is complete and precoding is applied.

In step S18, $eNB_A$ has to be notified of the resources allocated to $UE_B$ by $eNB_B$, so that interference co-ordination can occur. The same resource allocation will be made to another terminal in Cell A which also receives the orthogonal precoder.

Next, (steps S20 and S22) $eNB_A$ has to select a suitable user as $UE_A$ to be precoded with $V_0$, such that the capacity loss for this user can be minimized. Details of this process are given below. As indicated in the Figure, in certain embodiments this can include first (S20) finding a set of candidate UEs for this purpose and second (S22) selecting one UE from the set in accordance with any of various criteria.

Operation of the wireless communication system then proceeds with $UE_B$ served by $eNB_B$ in accordance with the resource allocation notified to $eNB_A$, which resource allocation (or an overlapping allocation) is also made to the selected UE.

The system has to be responsive to channel changes of $H_{AA}$, $H_{BB}$ and $H_{AB}$. Thus, S22 may be followed by a step S24 of monitoring conditions and if a change is detected (S26), returning to the start of the procedure.

Embodiments of the invention will now be described in more detail.

In general, unless otherwise indicated, the embodiments described below are based on LTE, where the network operates using FDD and comprises one or more eNodeBs, each controlling one or more downlink cells, each downlink cell having a corresponding uplink cell. Each DL cell may serve one or more terminals (UEs) which may receive and decode signals transmitted in that serving cell.

In current systems, during normal operation, each cell transmits a number of signals and channels in broadcast to all UEs, whether they are being served by the cell or not such as: the PSS, SSS, CRS and PBCH. These convey timing information, PCI, and other essential system information common to the cell. Other information is transmitted to UEs being served by the cell, on channels including PDCCH. A PDCCH message typically indicates whether the data transmission will be in the uplink (using PUSCH) or downlink (using PDSCH), it also indicates the transmission resources, and other information such as transmission mode, number of antenna ports, data rate, number of codewords enabled, precoder and rank. Some of this control information is carried in the DCI.

In embodiments, we assume that a first UE, $UE_B$, initially connected to and at the edge of a cell provided by $eNB_A$ receives interference from downlink transmissions from $eNB_B$. We further assume there is at least a second UE, $UE_A$, also served by $eNB_A$, and that it is possible for the two eNBs to agree to schedule certain users in the same resources in their respective cells.

While UE is connected to $eNB_A$, strong interference comes from $eNB_B$. On the other hand, after $UE_A$ has been handed over to $eNB_B$ and $H_{AB}$ becomes the interference channel. The interference is there because both cells are loaded and resources are in collision. It should be noted that here, the handover is a procedure to obtain channel knowledge, not in itself a measure to control interference.

First Embodiment

User and Interference Mitigation Precoder Selection Based on PMI Feedback

FIG. 6 is generally applicable to this embodiment. When a suitable measurement of signal quality, such as RSRQ sent to the network by $UE_B$, falls below a predefined threshold (S10 in FIG. 6) this triggers the method.

In S12, $eNB_A$ stores a recent RI+PMI pair indicated by $UE_B$. This PMI, henceforth termed $V_s$, is $UE_B$'s preferred precoder for channel $H_{AB}$.

Next (S14) $eNB_A$ initiates a handover of $UE_B$ to $eNB_B$. Upon completion of this, $eNB_A$ becomes a strong source of interference to $UE_B$, assuming the cells are fully loaded such that $eNB_A$ has to use the same resources for one of its users.

Then (S16) $eNB_A$ determines a precoder, $V_0$, which has good interference reduction properties with respect to channel $H_{AB}$. In this embodiment, this is done using knowledge only of $V_s$. In particular, we propose that $V_0$ is selected as a precoder which can in some sense be said to be that which is most orthogonal to $V_s$. We further propose below a method for selecting a precoder on such a basis. Other methods of selecting on this basis may be used without departing from the principles of the invention.

Meanwhile (S18) $eNB_B$ has allocated resources to $UE_B$ and informs $eNB_A$ of the resources. In variations, this allocation can be into resources predetermined and reserved for the purpose, or dynamically by a scheduler operating on $eNB_B$. If the resources are predetermined, they may already be known to $eNB_A$ by virtue of operator configuration or specification, or if not or if they are scheduled, the allocation may be exchanged over the X2 interface.

Next (corresponding to a combination of steps S20 and S22 in FIG. 6), from among the users served by $eNB_A$ and which have current downlink resource needs, the $eNB_A$ selects one, $UE_A$, which could be precoded with $V_0$ and retain acceptable performance. We further propose below a method for selecting such a user. Other methods may be used without departing from the principles of the invention.

$eNB_A$ assigns this user the same resources as informed by $eNB_B$ in S18. The signal is pre-coded with $V_0$, this fact being indicated via the DCI in the relevant PDCCH, and this precoding should reduce the interference to $UE_B$ at the cell edge.

The scheduling of users happens at LTE eNBs on a sub-frame basis, on 1 ms intervals. The $eNB_A$ can decide which user to pair with the cell edge $UE_B$ at each scheduling interval. It may choose to do an exhaustive search as just described, or in variations it may change $UE_A$ only when the in-cell user data rates or RSRQ drop below an acceptable level. In the simplest case, the resource allocation at $eNB_B$ remains stable, but in the event that $eNB_B$ wishes to change the resource allocation to $UE_B$, it may communicate this to $eNB_A$. If necessary the eNBs may co-ordinate to agree on changes in resource allocations.

After some time, channel $H_{AB}$ may change to an extent that the interference reduction is no longer suitable. One indication of this could be falling RSRQ measurements at $UE_B$, or the system could be configured to update the precoding with a certain periodicity, either configurable at the eNB or defined in specifications. When such a case occurs, if the network wishes to preserve the resource and user allocations, $UE_B$ can be handed over to $eNB_A$ again and the methods described above repeated.

A method for selecting $V_0$ will now be described.

Consider the SVD of $H_{AB} \in \mathbb{C}^{n_R \times n_T}$. The first $n_R$ vectors of its orthonormal right-singular matrix $V_{AB}$ are the column space of $H_{AB}$ and the remaining $(n_T - n_R)$ columns are the null space of $H_{AB}$. Transmission of the signal x will occur on the vectors making up the column space. A good precoder may be one which is a good quantized representation of the column space—we assume that such a precoder is represented by $V_s$. To reduce interference through $H_{AB}$, a better precoder could be one which is a quantized representation of the nulispace of $H_{AB}$. The vectors of the nullspace of $H_{AB}$ are each orthogonal to each of those in the column space, and we thus propose to choose $V_0$ as the precoder whose columns are each most orthogonal to each of those in the preferred precoder $V_s$ indicated via the PMI.

Our choice of precoder is limited to those in the codebook, so calling the precoder of the N in the codebook V(n), fixing $V_s$ and defining a similarity index $S_s(n)$ by:

$$P_s(n) = V_s^\dagger \cdot V(n)$$

$$S_s(n) = \sum_{i=1}^{n_T} \sum_{j=1}^{n_R} |P_s(n)^{(j,i)}|,$$

$$n = 1 \ldots N$$

$$n^* = \underset{n}{\operatorname{argmin}}\, S_s(n)$$

[deleted]
then our proposal is to prefer as $V_0$ a precoder corresponding to a low value of $S_s(n)$, such as $V_s = V(n^*)$.

Here, P is the product between two precoding matrices and $V_s$ and V(n). $P_s(n)^{(j,i)}$ denotes the $(j, i)^{th}$ element of matrix $P_s(n)$, [ ] denotes the magnitude and † denotes Hermitian transpose.

Since the precoders are fixed, $V_0 = V(n^*)$ could be pre-computed for each $V_s$ and either stored in the eNB memory or provided in specifications. It need not be computed on-the-fly in general.

A method for selecting $UE_A$ will now be described.

Consider the set of users $u = 1, 2, \ldots, U$ served by $eNB_A$ which can be scheduled for downlink transmission in the resources identified in S16. They have a set of preferred precoders W(u). To identify a user whose precoder is similar in an alignment sense to $V_0$, we define a similarity index $S_0(u)$ by:

$$Q_0(u) = V_0^\dagger \cdot W(u)$$

$$S_0(u) = \sum_{i=1}^{n_T} \sum_{j=1}^{n_R} |Q_0(u)^{(j,i)}|,$$

$$u = 1 \ldots U$$

$$u^* = \underset{u}{\operatorname{argmin}}\, S_0(u).$$

where Q is the product between the null space vector $V_0$ and the most suitable vector for $UE_A$, denoted W(u).

Here, we prefer a user with a high value of the similarity index $S_0(u)$, such as user u*. If multiple users satisfy the selection method, they could be selected among randomly.

Second Embodiment

Multiple $V_0$ Candidates

The second embodiment is like the first, except that $eNB_A$ considers more than one possibility for $V_0$. Concretely, the set $\tilde{V}(k)$ of precoders $k = 1, \ldots K$ with the K ?highest? values of $S_s(n)$ are considered by the eNB as potential precoders for use with $UE_A$ (rather than only $V_0$). The precoders W(u) preferred by users served by $eNB_A$ (described above) are then compared to each member of $\tilde{V}$ to yield a similarity index S(k,u):

$$T(k, u) = V(k)^\dagger \cdot W(u)$$

$$S(k, u) = \sum_{i=1}^{n_T} \sum_{j=1}^{n_R} |T(k, u)^{(j,i)}|,$$

$$k = 1 \ldots K; u = 1 \ldots U$$

$$\{k^*, u^*\} = \underset{k,u}{\operatorname{argmin}}\, S(k, u)$$

where T is the product between one of the possible options for $V_0$ (termed $V^\sim$) and W(u). In this case, a pair $\{k, u\}$, being the $V_0$ candidate and $UE_A$, is preferred which corresponds to a high value of the similarity index S(k,u) such as the pair $\{k^*, u^*\}$. If multiple users satisfy the selection method, they could be selected among randomly.

Third Embodiment

Further $UE_A$ Selection Based on SINR

This third embodiment is like any preceding embodiment, except that if multiple users satisfy the selection method these users are further ranked according to their signal-to-interference-plus-noise ratio (SINR), and a user with a high SINR value is preferred so that capacity loss due to being required to precode with $V_0$ does not result in outage at $UE_A$.

Fourth Embodiment

Further $UE_A$ Selection Based on Correlation

A fourth embodiment is like the first or second except that if multiple users satisfy the selection method these users are further ranked according to a measure of correlation between $H_{AB}$ and the candidates for $H_{AA}(u)$. We further propose below a method for selecting such a user:

Consider the set of users $u = 1, 2, \ldots, U$ served by $eNB_A$ which can be scheduled for downlink transmission in the resources identified in S16 of FIG. 6. They have a set of preferred precoders W(u). To identify a user whose channel $H_{AA}$ may be weakly correlated with channel $H_{AB}$ for which $UE_B$'s preferred PMI is $V_s$, we define:

$$R(s, u) = V_s^\dagger \cdot W(u)$$

$$C(s, u) = \sum_{i=1}^{n_T} \sum_{j=1}^{n_R} |R(s, u)^{(j,i)}|,$$

$$u = 1 \ldots U.$$

This can be a measure of the similarity between precoders for channel $H_{AA}$ and $H_{AB}$.

Therefore, a user with a low value of C(s, u) is preferred, such as user $$u^* = \underset{uC(s,u)}{\operatorname{argmin}}$$

The effect is somewhat similar to the first and second embodiments, but the difference is that the pre-coders are only approximate matches to the actual channel. There are only a fixed number of pre-coders, but the channel variations are infinite, so a range of channel maps to a single pre-coder. In this context, doing this additional test helps to identify a channel (or at least a pre-coder) least correlated to $V_s$.

Fifth Embodiment

Further $UE_A$ Based on Physical Proximity

This fifth embodiment is like the the first or second except that if multiple users satisfy the selection method these users are further ranked according to the physical separation between a candidate $UE_A$ and $eNB_B$ with a user having a large such physical separation being preferred, so that interference via $H_{BA}$ to $UE_A$ is not significant. There is no interference cancelling pre-coding from $eNB_B$, so increasing this physical separation (whilst known in itself as an interference-mitigation technique) is a preferable add-on feature to the basis embodiment.

Sixth Embodiment

Threshold for $UE_A$ Selection

This sixth embodiment is like the first or second, except that the value of $S_0(u)$ or $S(k, u)$ respectively for user a must further be at or above a predefined threshold for the user to be considered among the set for selection. If no users are at or above the predefined threshold in this embodiment, then the eNB may decide to precode no UE with $V_0$, using instead for example each UE's preferred precoder for its own channel $H_{AA}$. Alternatively, the methods of the third, fourth or fifth embodiments (in any combination) may be used instead to select among the users.

In a variation, the threshold is set independently for each user or for groups of users according to, e.g. their QoS needs.

In further variations, the threshold(s) may be fixed at the eNB by the operator of the network, they may be variable dynamically by the eNB according to metrics such as QoS requirements in its cell or for its users, or the thresholds may take on one or more predetermined values set out in specifications.

Such thresholds may also be applied to the parameters used in the third through fifth embodiments in addition to, or alternatively to, that applied to $S_0(u)$. These parameters include: high SNR in third embodiment, C(s,u) in 4th embodiment, physical distance between eNB-B and UE-A in 5th embodiment Seventh Embodiment Double Threshold for $UE_A$ Selection This seventh embodiment is like the sixth except that an additional, lower, threshold is also defined. If any users have a value of $S_0(u)$ or $S(k, u)$, as appropriate, above the upper threshold, the method proceeds according to the sixth embodiment.

If no user has a value of $S_0(u)$ or $S(k, u)$, as appropriate, above the upper threshold but at least one has a value of $S_0(u)$ or $S(k, u)$ as appropriate above the lower threshold, then the set of users between the two thresholds is considered for scheduling. Among these users, one is chosen according to the methods of the third, fourth or fifth embodiments.

Thus the additional steps of the third, fourth or fifth embodiments are considered if the higher embodiments fail to produce a clearly suitable user for pre-coding with $V_0$.

These embodiments may be considered individually or as weighted values according to operator preference.

Eighth Embodiment

Single Base Station

This is based on any one or more of the previous embodiments, but in this case both cells (Cell A and Cell B in FIG. 5) are provided by the same base station. Consequently there is no need for $eNB_A$ to receive information from $eNB_B$ since these are one and the same. The single base station will still perform a handover as before, but this time the handover is from one cell controlled by the base station, to another cell controlled by the handover.

Of course, co-ordination between the cells is particularly simple in this case, and the method may be repeated as often as desired by the base station, for example, if the base station decides to change the resource allocation in Cell B to the handed-over UE, this may prompt a review of which UE served by Cell A is most suitable to share this same resource allocation.

In a variation, any combination of the parameters (not the methods) of the first through fifth embodiments can be used to rank those users between the two thresholds, with different weights assigned to the various embodiments so as to represent the priority with which the eNB or network operator views those parameters.

If all users have values of $S_0(u)$ or $S(k, u)$, as appropriate, below the lower threshold, then the eNB may decide to schedule precode no UE with $V_0$, using instead for example each UE's preferred precoder for its own channel $H_{AA}$.

Such double thresholds may also be applied to the parameters used in the third through fifth embodiments in addition to, or alternatively to, that applied to $S_0(u)$ or $S(k, u)$, as appropriate.

To summarise, embodiments of the present invention provide methods to choose users and associated preceding for spatial multiplexing in MIMO systems where inter-cell interference is severe. Considering neighbouring first and second cells, a first user in the first cell may experience significant interference from downlink transmissions in the second cell. Such interference can be reduced by selecting a precoder for downlink transmission to the second user in the first cell which will result in reduced interference to the first user after it is handed-over to be served by the second cell. This precoder selection is on the basis of knowing only the first user's preferred precoder(s) in the first cell, allowing application of the method when users have only the basic capabilities standardized in Release 8 of LTE and other similar systems.

The methods involve selecting, among a plurality of users in the first cell, the second user to receive the preceded downlink transmissions using the selected precoder. The second user will be chosen so as to satisfy any of a number of measures of suitability for being transmitted to using the selected interference-reducing precoder. Taken together, the choice in the first cell of precoder and second user can result in reduced inter-cell interference versus a controlled tradeoff of potentially lower information capacity for the second user.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

Such a microprocessor or DSP may be present in a base station of a wireless communication system. In a wireless communication system employing relay stations, it will be further preferable for each relay station to include functionality for performing the method according to the present invention. A processor or DSP of each subscriber station may also need adaptation to the method of the present invention, in particular to provide for sending messages to a base station outside its cell where this is required. Moreover, a subscriber station in a peer-to-peer network could itself carry out the method of the present invention.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, ear provided on a carrier signal, or in any other form.

Various modifications are possible within the scope of the present invention.

The invention has been described with reference to LTE FDD, but could also be applied to other communication systems which use precoding, for example WiMAX and others.

Embodiments may in general be combined as appropriate, for example, allowing selection of a $UE_A$ on the basis of any combination of the parameters described in the second, third and fourth embodiments; or to switch between the first and second embodiments based on relevant parameters such as QoS requirements; or for example so as to impose different types and levels of thresholds on the various parameters.

In the case of the second embodiment the relevant parameter is S(k,u). This is relevant because as noted before, the channel is an approximate match to one of the finite set of pre-coders. If a channel lies in between two (or even 4 in multi-dimensional vector space) pre-coders then more than 1 pre-coder can become the best choice of orthogonal vector $V_0$ for this channel.

In general, in embodiments, where an optimal solution is sought a suboptimal choice may nevertheless be made if the needs of scheduling or other needs demand it, without departing from the principles of this invention.

The above description refers to a "base station" as carrying out the techniques of the present invention, but in general the present invention can be applied to any transmitter capable of communicating with multiple users in a wireless communication system including a relay station, a subscriber station in a peer-to-peer network, etc. The term "base station" as used in the claims should accordingly be given a broad interpretation.

The arrangement of cells need not be as schematically shown in FIG. 5 with Cell A adjacent to Cell B. Instead, the cells provided by the base station may be partly or even wholly overlapping. This would be the case in a heterogeneous network. In such a scenario, $eNB_A$ might be a macro base station whilst $eNB_B$ could be a femto station (Home eNB) for example.

INDUSTRIAL APPLICABILITY

In systems known to the art, high levels of inter-cell interference may be experienced by UEs to an extent that existing methods such as FFR and (e)ICIC cannot reduce interference to suitably-low levels. In the case of a network operating a multiple-input multiple-output (MIMO) transmission mode, modifying the transmission profile of an interfering eNodeB by spatial precoding could be used to provide another domain in which interference can be reduced. This invention provides means for selecting precoders and users jointly in two cells such that interference is reduced further than would be possible by the application of existing techniques alone. Furthermore, it provides this interference reduction without requiring new information from UEs and thus is able to apply to systems containing diverse UE populations, extracting a further improvement compared to existing ICIC schemes which are UE-capability dependent. The selection of precoders and users is on the basis of a flexible set of metrics so that the tradeoff of reduce interference to one user at the price of potentially reduced information capacity at the other user can be minimized, or controlled to a level acceptable to the network or the network operator. Combined with the fact of backwards compatibility, this means that the overall balance of the effects of the invention can be tailored to the needs of many different capabilities of UE, thus allowing interference reduction to be applied very broadly across a network.

The invention claimed is:

1. A wireless communication method in which one or more base stations allocate resources to, and wirelessly communicate with, terminals served by first and second cells, wireless communications with the terminals being performed by precoding in accordance with a precoder, the method comprising:
   detecting that a terminal served by the first cell is subject to interference from the second cell;
   in response to the detecting, storing a preferred precoder of the terminal when the terminal is served by the first cell and performing a handover of the terminal to the second cell;
   after the handover, obtaining a resource allocation to the terminal in the second cell and determining an interference-reducing precoder based on the stored preferred precoder; and
   selecting another terminal served by the first cell, after the handover, with which to precode communications by the interference-reducing precoder.

2. The method according to claim 1, wherein the first cell disposes of a number of antenna ports greater than a number of antenna ports of each terminal.

3. The method according to claim 1, wherein the detecting comprises reporting by the terminal to the first cell that a measurement of signal quality falls below a predetermined threshold.

4. The method according to claim 1, further comprising transmitting by the terminal an indication of its preferred precoder to the first cell.

5. The method according to claim 1, wherein:
   the first and second cells are provided by different base stations, and
   the obtaining comprises, at the base station providing the first cell, receiving an indication of the resource allocation from the base station providing the second cell.

6. The method according to claim 1, wherein:
   the resource allocation to the terminal in the second cell is a predetermined resource allocation, and
   the obtaining comprises retrieving stored information of the predetermined resource allocation.

7. The method according to claim 1, wherein the determining comprises determining, as the interference-reducing precoder, a precoder having greatest orthogonality to the stored preferred precoder.

8. The method according to claim 1, wherein the selecting comprises selecting, as said another terminal, a terminal served by the first cell whose own preferred precoder has a greatest similarity with the interference-reducing precoder.

9. The method according to claim 1, wherein the determining and selecting comprises determining, as the interference-reducing precoder, a set of candidate precoders, the selecting then being performed by comparing the set of candidate precoders with preferred precoders of other terminals served by the first cell.

10. The method according to claim 1, wherein the selecting of said another terminal is performed from among a set of candidate terminals in accordance with one or more selection criteria selected from:
 a degree of similarity between the preferred precoder of the candidate terminal, and the interference-reducing precoder;
 a SINR of the candidate terminal;
 a degree of correlation of a channel between a base station of the first cell and the candidate terminal, and an interference channel between the base station of the first cell and the terminal after handover;
 a physical proximity between the candidate terminal and a base station of the second cell; and
 a capacity loss of communications within the first cell if the candidate terminal is selected.

11. The method according to claim 10, wherein the selecting further comprises determining said set of candidate terminals on the basis of whether terminals fulfill at least one threshold value of the degree of similarity between the preferred precoder of the candidate terminal and the interference-reducing precoder.

12. The method according to claim 1, further comprising repeating at least the determining and selecting steps to deal with changes in wireless channels in and/or between the cells.

13. A non-transitory computer-readable recording medium storing a program which, when executed by a processor of a base station, performs the method of claim 1.

14. A base station in a wireless communication system in which a plurality of terminals are served by first and second cells, the base station providing at least said first cell and arranged to allocate resources to terminals and to perform wireless communications with terminals by precoding in accordance with a precoder, the base station comprising:
 detecting means for detecting that a terminal served by the first cell is subject to interference from the second cell;
 storing means for, responsive to detecting the interference from the second cell, storing a preferred precoder of the terminal when the terminal is served by the first cell;
 handover means for handing over the terminal to the second cell after storing the preferred precoder by the storing means;
 obtaining means for obtaining a resource allocation to the terminal in the second cell after handing over the terminal to the second cell by the handover means;
 precoder determining means for determining an interference-reducing precoder based on the stored preferred precoder after handing over the terminal to the second cell by the handover means; and
 selecting means for selecting another terminal served by the first cell, after handing over the terminal to the second cell, with which to precode communications by the interference-reducing precoder.

15. A wireless communication system comprising:
 one or more base stations forming first and second cells; and
 a plurality of terminals coupled to the one or more base stations;
 the one or more base stations arranged to allocate resources to, and wirelessly communicate with, terminals served by the first and second cells, and to perform wireless communications with the terminals by precoding in accordance with a precoder, the wireless communication system comprising:
 detecting means for detecting that a terminal served by the first cell is subject to interference from the second cell;
 storing means for, responsive to detecting the interference from the second cell, storing a preferred precoder of the terminal when the terminal is served by the first cell;
 handover means for handing over the terminal to the second cell after storing the preferred precoder of the terminal by the storing means;
 obtaining means for obtaining a resource allocation to the terminal in the second cell after handing over the terminal to the second cell by the handover means;
 precoder determining means for determining an interference-reducing precoder based on the stored preferred precoder after handing over the terminal to the second cell by the handover means; and
 selecting means for selecting another terminal served by the first cell, after handing over the terminal to the second cell, with which to precode communications by the interference-reducing precoder.

16. A wireless communication method in which one or more base stations allocate resources to, and wirelessly communicate over wireless channels with, terminals served by first and second cells, wireless communications with the terminals being performed by precoding in accordance with a precoder, the method comprising:
 detecting that a terminal served by the first cell is subject to interference from the second cell;
 in response to the detecting, storing a preferred precoder of the terminal when the terminal is served by the first cell and performing a handover of the terminal to the second cell, the handover being performed to obtain channel knowledge and not being triggered by normal handover criteria;
 after the handover, obtaining a resource allocation to the terminal in the second cell, and determining an interference-reducing precoder based on the stored preferred precoder; and
 selecting another terminal served by the first cell, after the handover, with which to precode communications by the interference-reducing precoder.

* * * * *